(12) United States Patent
Scheiber

(10) Patent No.: US 8,159,384 B2
(45) Date of Patent: Apr. 17, 2012

(54) METHOD FOR EXAMINING AN ICE REGION OR DRY REGION USING RADAR ECHO SOUNDING

(75) Inventor: Rolf Scheiber, Puchhelm (DE)

(73) Assignee: Deutsches Zentrum fur Luft-und Raumfahrt E.V. (DE)

( * ) Notice: Subject to any disclaimer, the term of this patent is extended or adjusted under 35 U.S.C. 154(b) by 242 days.

(21) Appl. No.: 12/532,935

(22) PCT Filed: Mar. 14, 2008

(86) PCT No.: PCT/EP2008/002052
§ 371 (c)(1),
(2), (4) Date: Mar. 2, 2010

(87) PCT Pub. No.: WO2008/119455
PCT Pub. Date: Oct. 9, 2008

(65) Prior Publication Data
US 2010/0171651 A1    Jul. 8, 2010

(30) Foreign Application Priority Data
Mar. 29, 2007   (DE) .......................... 10 2007 015 561

(51) Int. Cl.
G01S 13/90    (2006.01)
G01S 13/89    (2006.01)
G01S 7/40     (2006.01)
G01S 13/00    (2006.01)
G01S 7/00     (2006.01)

(52) U.S. Cl. ...... 342/25 F; 342/22; 342/25 R; 342/25 A; 342/73; 342/74; 342/81; 342/159; 342/165; 342/173; 342/174; 342/175; 342/176; 342/179; 342/190; 342/191; 342/194; 342/195

(58) Field of Classification Search .................... 342/21, 342/22, 25 R–25 F, 59, 73–81, 159–176, 342/179, 190–197, 368–377
See application file for complete search history.

(56) References Cited

U.S. PATENT DOCUMENTS
3,995,271  A    11/1976  Goggins, Jr.
(Continued)

OTHER PUBLICATIONS

Braaten D., et al., "Radar Measurements of Ice Sheet Thickness of Outlet Glaciers in Greenland", IGARSS 2002; IEEE 2002; International Geoscience and Remote Sensing Symposium, Toronto, Sweden, Jun. 24-28, 2002; International Geoscience and Remote Sensing Symposium, New York, NY; vol. 4, Jun. 24, 2002, pp. 2188-2189.

(Continued)

*Primary Examiner* — Bernarr Gregory
(74) *Attorney, Agent, or Firm* — Hoffman & Baron, LLP

(57) ABSTRACT

To suppress cross-ambiguities in the examination of an ice region or dry region by means of aircraft- or aerospace-supported radar echo sounding, the region to be examined is overflown by a radar sensor (6) by multiple compatible radar sensors of the same operating wavelength on multiple spatially separated, substantially parallel paths, wherein the radar signal data received on each path are recorded. The radar signal data recorded for each of the different paths are summed coherently and using a weighting to form a radar-gram, wherein an adaptive complex-valued weighting for each of the individual paths is performed using a geometrical model which takes into account the topography of the environment of the region to be examined. The weighting for every depth of the examined region is determined by solving a system of linear equations from which is calculated a synthetic antenna pattern which has zeros in the direction of the ambiguities.

Implementation in radar systems for echo sounding in ice and in dry regions on earth or other planets and extraterrestrial objects.

7 Claims, 7 Drawing Sheets

U.S. PATENT DOCUMENTS

| | | | | |
|---|---|---|---|---|
| 4,218,678 | A * | 8/1980 | Fowler et al. | 342/194 |
| 4,504,833 | A * | 3/1985 | Fowler et al. | 342/22 |
| 4,831,383 | A * | 5/1989 | Ohnishi et al. | 342/25 A |
| 4,839,654 | A * | 6/1989 | Ito et al. | 342/22 |
| 5,339,080 | A * | 8/1994 | Steinway et al. | 342/25 R |
| 5,673,050 | A * | 9/1997 | Moussally et al. | 342/22 |
| 5,796,363 | A * | 8/1998 | Mast | 342/179 |
| 5,900,833 | A * | 5/1999 | Sunlin et al. | 342/22 |
| 5,912,639 | A * | 6/1999 | Beckner | 342/176 |
| 5,952,954 | A * | 9/1999 | Beckner | 342/159 |
| 6,091,354 | A * | 7/2000 | Beckner et al. | 342/22 |
| 6,130,641 | A * | 10/2000 | Kraeutner et al. | 342/179 |
| 6,147,636 | A * | 11/2000 | Gershenson | 342/25 F |
| 6,188,348 | B1 * | 2/2001 | Raney | 342/22 |
| 6,255,980 | B1 * | 7/2001 | Matthews | 342/22 |
| 6,445,334 | B1 * | 9/2002 | Bradley et al. | 342/22 |
| 6,590,519 | B2 * | 7/2003 | Miceli et al. | 342/22 |
| 6,621,448 | B1 * | 9/2003 | Lasky et al. | 342/22 |
| 6,894,637 | B2 * | 5/2005 | Moreira et al. | 342/22 |
| 6,982,666 | B2 * | 1/2006 | Temes et al. | 342/22 |
| 7,190,302 | B2 * | 3/2007 | Biggs | 342/22 |
| 7,528,762 | B2 * | 5/2009 | Cerwin | 342/22 |

OTHER PUBLICATIONS

Barbarossa, S., et al., "A Conceptual SAR/Altimeter Radar with Subsurface Capabilities for Space Missions", IEEE International Radar Conference; May 7, 1990; pp. 76-80.

Picardi, G., et al.; "Coherent Cancellation of Surface Clutter for Radar Sounding", Geoscience and Remote Sensing Symposium, 1999; IGARSS '99 Proceedings; IEEE 1999 International Hamburg, Germany, Jun. 28-Jul. 2, 1999; Piscataway, NJ; vol. 5, Jun. 28, 1999; pp. 2678-2680.

Scheiber, Rolf, et al.; "Surface Clutter Suppression for Ice Sounding Radars by Coherent Combination of Repeat-Pass Data"; IEEE International Geoscience and Remote Sensing Symposium, IGARSS 2007; Jun. 23-Jun. 28, 2007; pp. 3559-3562.

Rodriguez, F, et al., A New Technique for Interferometric Sounding of Ice Sheets; Eusar 2006, Dresden, Germany, May 16-18, 2006.

* cited by examiner

METHOD FOR EXAMINING AN ICE REGION OR DRY REGION USING RADAR ECHO SOUNDING

TECHNICAL FIELD

The invention is directed to a method for examining an ice region or dry region using radar echo sounding, wherein a radar sensor flying over the region to be examined emits radar transmission pulses in the direction of the nadir, illuminating the surface and the inner volume of the region, wherein the reflected radar pulse signals received in the radar sensor are processed and evaluated to obtain a radargram, and wherein measures are provided to suppress ambiguities.

An explanation of the general operation of a radar method for echo sounding in ice will be rendered hereunder. Such radar methods have been used for more than two decades in Antarctica, Greenland and on other smaller islands, such as Spitsbergen-Svalbard, to derive information about ice layers, ice thicknesses as well as the bedrock of the ice plates. The information derived consists of a depth profile of the ice mass and is generally referred to as a radargram. It includes the radar reflectivity of adjacent media with different dielectric properties. The strongest reflections usually occur at the air/ice interface or at the lower boundary of the ice mass with the bedrock.

PRIOR ART

It should be noted here that the radar echo sounding device MARSIS on the space shuttle Mars Express has successfully evidenced the existence of frozen water on Mars. In this context, reference is made to the article by Picardi, G. et al., "Radar Soundings of the Subsurface of Mars", Science, Vol. 310, Dec. 23, 2005, pages 1925-1928. This shows that such examinations of ice are of interest no only for earth.

Echo sounding radar examinations of ice are usually performed at low frequencies (some 10 to 500 MHz) that cause a great penetration depth of the waves into the volume of ice. Reflections also occur for internal boundary layers with different dielectric properties, e.g. with thin deposits of volcanic ash.

In order to increase the sensitivity, the last five to ten years have seen the ongoing replacement of the old airplane-borne radar devices with new coherent radar systems. These allow for a so-called Doppler processing (filtering or "Doppler Beam Sharpening") so as to artificially reduce the antenna pattern in the direction of flight (along track). Thus, ambiguity echoes coming from reflections before and behind the radar sensor can be filtered out or attenuated and the signal-to-noise ratio can be improved because of the coherent summing of the signal portions of interest. U.S. Pat. No. 6,188,348 B1 describes such methods.

However, these known methods do not substantially attenuate the so-called "cross ambiguities" coming from the left and the right side of the flight path (across track). FIG. 1 serves for clarification of this context, schematically illustrating the geometry across the direction of flight of a nadir-directed radar beam for echo sounding in ice. The direction of flight of the airplane-borne or space-borne radar sensor points vertically into the plane of illustration.

The high-frequency radar pulses are emitted through an antenna 1 of the radar sensor and the echo signals are received there as well. H defines the vertical altitude of the antenna 1 above a reference plane 2, with air being present between the antenna 1 and the reference plane 2 if the examination is performed on earth. Beneath the reference plane 2, the ice to be examined for its properties is situated with a maximum ice depth z.

Ambiguous ground track surface echo signals 3 and 4 from the left under an angle of deviation $\Theta_1$ to the direction of the nadir or from the right under am angle of deviation $\Theta_2$ from the direction of the nadir, respectively, and the useful signal 5 from the direction of the nadir are received at the antenna 1 of the radar sensor with the same propagation time determined by the radius R. These surface echo signals 3 and 4, respectively, are usually considerably stronger than the signal portions reflected by the inner ice layers and are mostly also stronger than the echo signals from the bedrock.

Airborne radar sensors keep these ambiguities on a rather low level by choosing a very low flight altitude H of a few hundred meters. Thereby, the depth up to which ambiguity signals superimpose the useful signal coming from the direction of the nadir is limited to the upper ice layers. However, for an application from space, other methods have to be devised.

Presently, two different methods are know for suppressing the previously mentioned "cross ambiguities" in radar echo sounding methods for the examination of ice.

In the first of these two methods, antennas with multiple apertures are used. In this case, at least two independent receiving apertures are required to form two different antenna patterns. A suitable combination, i.e. addition and subtraction, of the radar signals received in the two receiving channels allows to set a zero point in the direction of the nadir signal of interest in accordance with the mono-pulse principle known from target tracking radars, see, for instance, D. R. Wehner: "High Resolution Radar", Artech House, 1995. Hereby, the portion of the ambiguity signals can be isolated, weighted in a suitable manner and subtracted from the received signal.

This procedure principle is also used for MARSIS, the radar system on the space shuttle Mars Express, wherein the two receiving antenna apertures are formed by a regular dipole and an additional monopole whose zero point points in the direction of the nadir. This method is discussed in the article by G. Picardi, S. Sorge, R. Seu, G. Fedele, R. L. Jordan, "Coherent Cancellation of Surface Clutter for Radar Sounding", IGARSS Proceedings, IEEE Geoscience and Remote Sensing Symposium, Hamburg, Germany, IEEE 99CH36293C, Jun. 28-Jul. 2, 1999.

Antenna systems with multiple receiving antenna apertures have a number of drawbacks. For double aperture receiving antennas, for instance in MARSIS, a symmetry with respect to the left and the right ambiguities is supposed, which often is not true, however. Moreover, an increased hardware effort is required in the design and construction of the antenna, especially when more than two apertures are needed. Further, the data rate for the downlink of the receiving channels to earth is increased. Finally, the antenna patterns must be known exactly.

The second of these two methods is an interferometric off-nadir echo sounding method. This is a completely different type of method based on the principle of interferometry for an imaging radar with a synthetic aperture (SAR interferometry), i.e. a sensor system for generating digital topographic models that has proven itself in astronautics. Different from the traditionally nadir-oriented radar echo sounding method that can only determine a profile of the ice layers, the interferometric off-nadir echo sounding method, in a space-borne implementation, promises the imaging of a strip of several 10 km in width.

Based on interferometric received data of two spatially separate antennas, a so-called interferogram in the form of a conjugated complex product is calculated. The reflections caused by the ice surface and the bedrock occupy different frequencies in the spectrum of this interferogram and can be filtered if the system is so configured, whereby inferences on the ice thickness are obtained. Presently, this method is tested in the context of the "NASA Incubator" program and has been described in an article by E. Rodriguez, A. Freeman, K. Jezek, X. Wu: "A New Technique for Interferometric Sounding of Ice Sheets", Proc. EUSAR, VDE, ISBN 978-3-8007-2960-9, May 16-18, 2006.

The interferometric off-nadir radar echo sounding method also shows a number of drawbacks. For instance, the increased attenuation of the electromagnetic wave in the ice sheet may possibly make the detection of the bedrock considerably more difficult because of the of-nadir geometry. Moreover, reflections from inner ice sheets may possibly also be hard to detect in an off-nadir geometry.

Since the interferometric spectral components for ice surfaces and bedrock approach each other more closely with thin ice thicknesses, the discrimination between these two signal components is limited in this instance. Further, the hardware effort for an implementation of two spatially offset antennas and of two separate receiving channels is increased. Finally, the suppression of ambiguities is difficult for signal components of the respective opposite off-nadir side, since the signals generally do not superpose each other coherently.

SUMMARY OF THE INVENTION

It is an object of the present invention to provide an echo sounding method for the examination of an ice region or a dry region that is equally well suitable both for airplane-borne and space-borne radar sensors, with which echo signal ambiguities transversal to the overpass direction are excluded to a much higher extent than with the use of antenna systems with multiple receiving apertures, and wherein no strict requirements as to the knowledge of the antenna pattern or the planarity of the region of radar beam impingement are made.

According to the invention, which refers to a method for examining an ice region or dry region using radar echo sounding of the above mentioned type, this object is achieved by a radar sensor or a plurality of compatible radar sensors of the same operating wavelength fly over the region to be examined along multiple spatially separated adjacent or parallel paths and by recording the radar signal data received on each path, by summing the radar signal data recorded for each of the different paths in a coherent and weighted manner to form a radargram, wherein an adaptive complex-valued weighting of the radar signal data for each of the individual paths is performed using a geometrical model which takes into account the topography of the environment of the region to be examined, and by determining the complex-valued weighting for every depth of the region examined by solving a system of linear equations from which a synthetic antenna pattern is calculated that has zero points in the direction of the ambiguities.

The above mentioned compatible radar sensors are understood to be sensors operated at the same frequency and thus at the same operating wavelength. Here, the sensors do not necessarily have to be of the same structure; however, they have to be able to process the same signal bandwidth of the radar signal. Further, each sensor is defined by the position of its antenna and may either be operated actively (transmission and receiving mode) or passively (only receiving, i.e. bistatically, as is possible, for instance, for a constellation of satellites flying close to each other).

The method proposed by the present invention is equally suitable for airplane-borne and space-borne radar sensors. The latter may orbit the earth, the moon or other planets, such as Mars, for instance, and/or their moons, such as Jupiter's moon Europa, for instance.

The method of the invention proposed herein particularly consists in a suitably weighted, coherent combination of nadir-oriented radar data recorded during repeated spatially separated flights over the same ice region or dry region. For an airplane-borne radar system, the implementation is advantageously realized by means of parallel overpasses with short spatial base lines. For a space-borne implementation, radar data recorded during repeated orbits of the same radar sensor or similar compatible radar sensors are evaluated in a suitable manner.

Thus, the method of the present invention basically forms a large but sparsely occupied antenna arrangement. It is characterized by many and high grating lobes. Nevertheless, as will be shown hereinafter, it is possible to use the antenna arrangement for echo sounding in ice or in dry regions by suitably controlling the individual weights of the antennas.

To obtain an increased accuracy, the positions of the ambiguous surface reflections are calculated from the geometry of the data recording, taking into account a digital model of the topography. By inversion of a system of linear equations, the weights of the individual antennas/data recordings are determined in a further step. This calculation is performed individually for each ice depth or each depth of the dry region, wherein zero positions of the synthesized antenna pattern are set in the direction of the ambiguous surface reflections (zero steering, antenna pattern nulling). Finally, a coherent weighted summing of the individual data recordings produces a radargram whose ambiguities are significantly suppressed, i.e. by at least one order of magnitude.

The method for examining an ice region or a dry region using radar echo sounding according to the present invention offers a number of advantages.

"Cross ambiguities" are suppressed to a much greater extent than with the use of antenna systems having multiple apertures.

No strict requirements regarding the knowledge of the antenna pattern or the planarity of the ground exist.

The method according to the invention provides a perfect, exact echo sounding in the direction of the nadir and thus an increased sensitivity to the detection of inner ice sheets or dry layers as well as to reflections from the bedrock.

The performance of the ambiguity suppression is scalable in dependence on the number of available recordings/overpasses. A first suppression of ambiguities is already obtained from three overpasses. For space-borne systems, an improved suppression of ambiguities can be achieved, including suppression of the PRF range ambiguity caused by the pulse repetition frequency (PRF).

It is not required to suppose symmetry for the antenna or the arrangement of the overpasses, respectively.

Improved echo sounding properties are achieved, especially also for low ice depths.

The signal-to-noise ratio is improved by a factor corresponding to the number of antennas/overpasses.

Besides an application in radar systems for echo sounding in ice, the method operating according to the invention is also suited for echo sounding in dry regions of the earth and other planets ad extraterrestrial objects where substantial penetration depths are desired. On earth, this may allow the detection of antique settlements covered by sand or of old riverbeds in desert regions. When the method of the present invention is applied to planets, his method will enhance the detection of craters or ice sheets covered by sand or sediments as well as of further morphological features.

Advantageous developments and embodiments of the invention are mentioned in the claims referring directly or indirectly to claim 1.

DESCRIPTION OF THE INVENTION

Figure 2:
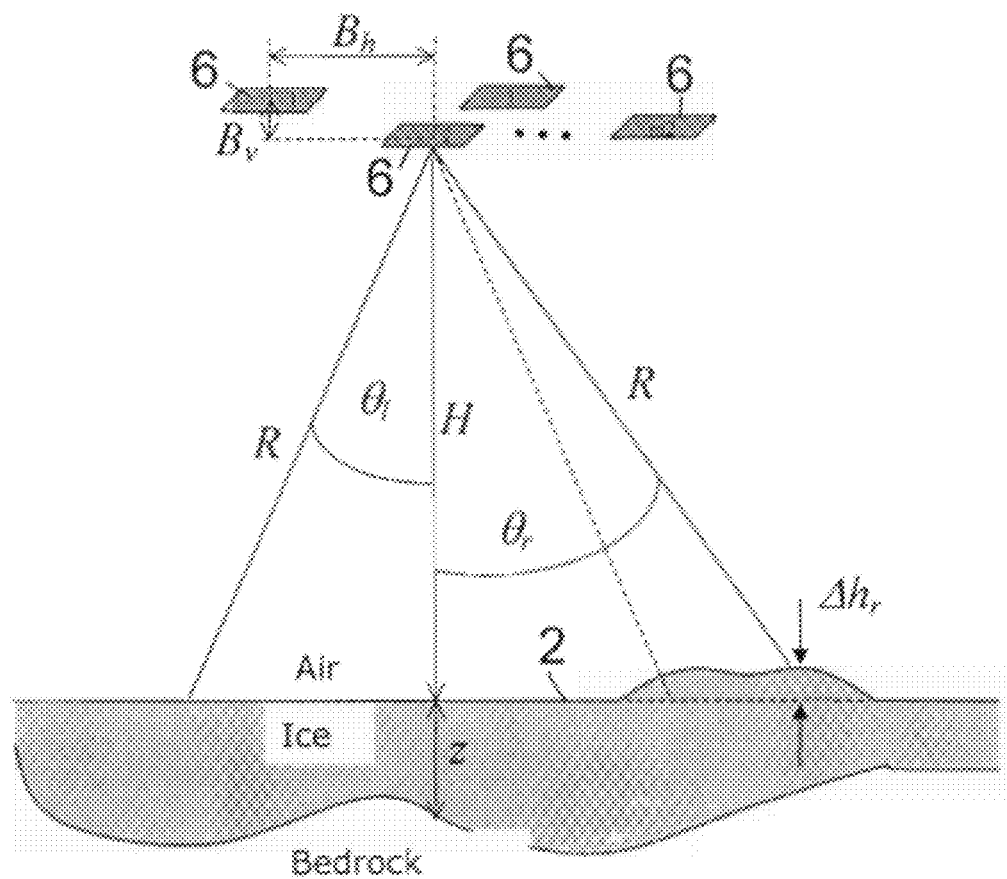

FIG. 2 is a schematic illustration of the radiation geometry of a nadir-oriented radar sensor 6 for echo sounding in ice. The direction of flight of the airplane- or space-borne radar sensor 6 is perpendicular to the plane of the drawing. Ambiguities transverse to the direction of flight superpose the interesting echo signal coming from the direction of the nadir. Because of the topography of the region to map, the geometry is generally not symmetric.

Figure 1:
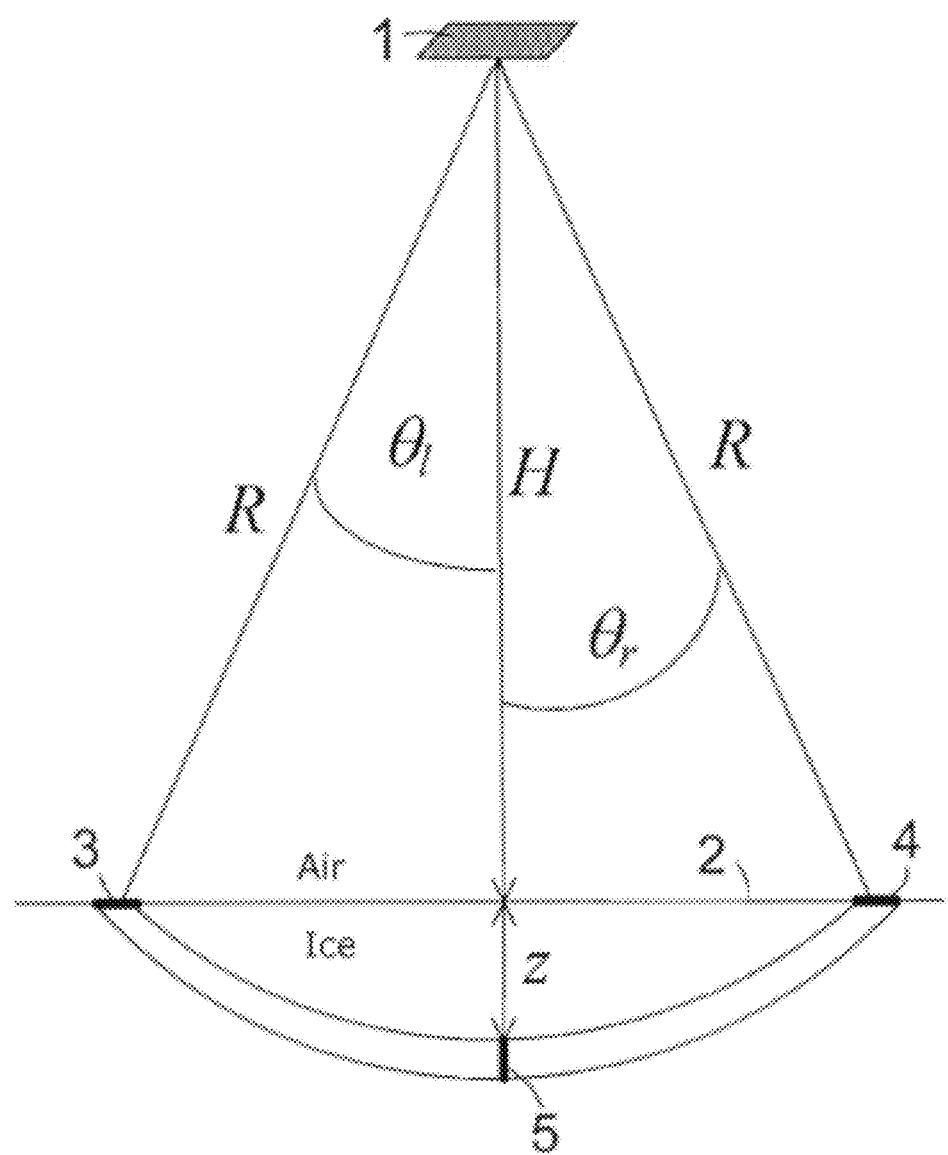
FIG. 1 is a schematic general view of the above explained geometry transverse to the direction of flight of a nadir-oriented radar sensor for echo sounding in ice, wherein ambiguous radar signals from the left and the right of the ground track and the useful signal from the direction of the nadir are received with the same propagation time, FIG. 2 also is a schematic view of a geometry transverse to the direction of flight of a nadir-oriented radar sensor for echo sounding in ice, wherein according to the method of the present invention multiple instances of spatially offset data recordings are performed by means of the radar sensor.

Due to physical and technical limits, the antenna aperture can not be large and thus sufficiently focussing to illuminate only the nadir region. Consequently, signals from the right and the left of the ground track are captured by the main lobe of the antenna. This fact has already been explained in the context of the description of FIG. 1 in which the same geometric numerals have been used as are now used in FIG. 2.

The multiple illustration of the radar sensor 6 is to symbolize that several spatially offset overpasses of the radar sensor 6 take place so that multiple radar data recordings (1, 2, 3, . . . , m2) of the ice region are available. Here, the horizontal length of the base line of the overpasses is indicated by $B_h$, and the vertical length of the base line is indicated by $B_v$.

In the example illustrated in FIG. 2, the altitude of the right ambiguity above the reference level 2 is designated as $\Delta h_r$. FIG. 2 does not illustrate a left ambiguity of an altitude $\Delta h_l$ above the reference level 2, but it may basically exist.

Figure 3:
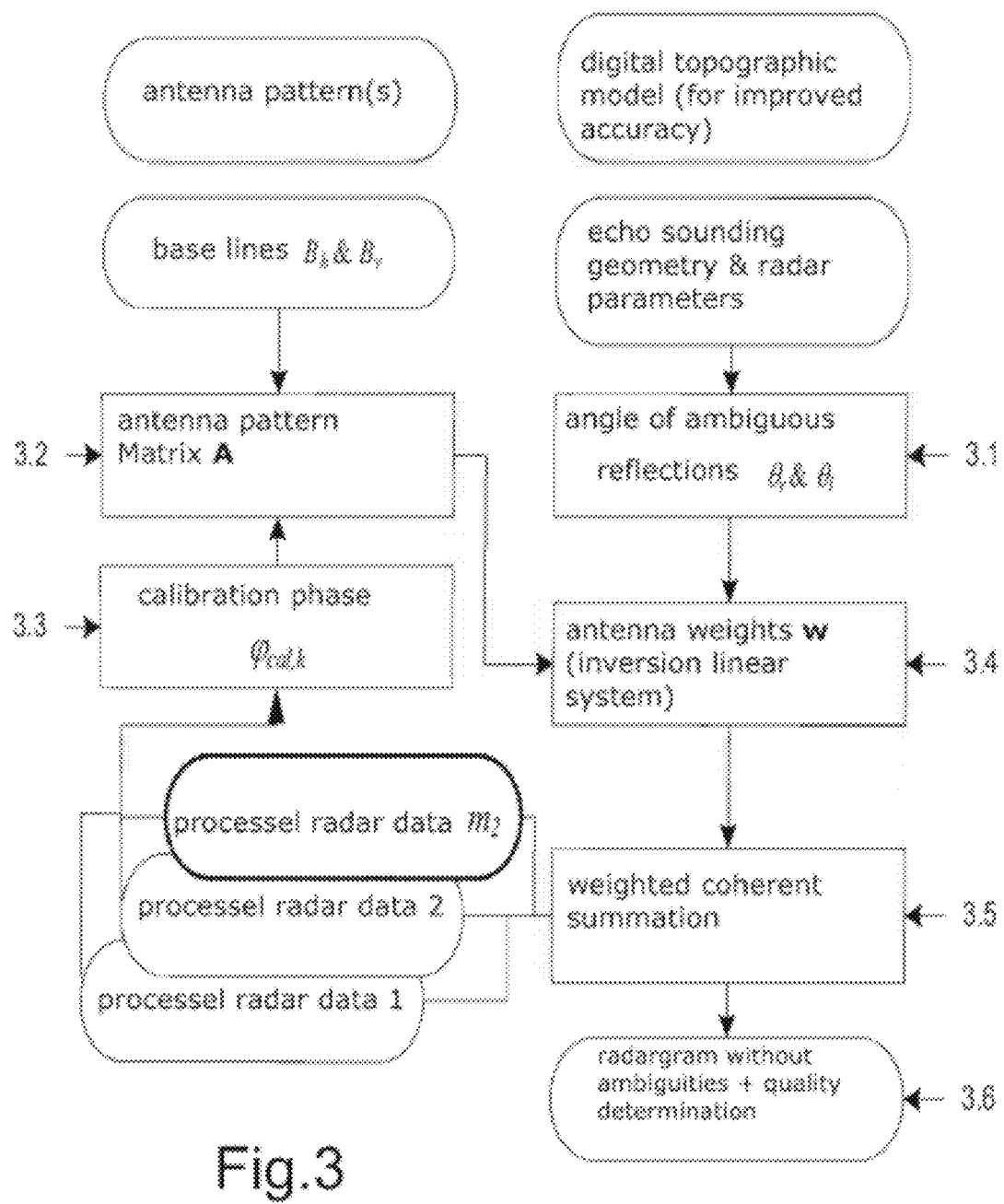
FIG. 3 is a block diagram illustration of the schematic flow of the method for examining an ice region or a dry region operating according to the present invention.

FIG. 3 illustrates a block diagram for the explanation of the flow of the method for suppressing ambiguities proposed by the present invention. This method will be explained hereunder using the geometry illustrated in FIG. 2 together with the flow scheme of FIG. 3.

From the geometry of the image, the directions of the surface ambiguities are determined as a function of the ice depth (item 3.1 in FIG. 3):

$$\theta_{l,r} = \arccos \frac{H - dh_{l,r}}{H + n \cdot z} = \arccos \frac{H - dh_{l,r}}{R}. \quad (1)$$

Here, H is the altitude of the reference antenna of the radar sensor 6 above the reference plane 2, $dh_l$ and $dh_r$ are the altitudes of the left and right ambiguities above the reference level 2, n is the refraction index in ice and z is the ice depth from which information is desired. The propagation time of the radar signal is the same for the nadir signal and the ambiguities and thus is $H+n \cdot z=R$.

For planar regions, an exact knowledge of the ice surface is not necessary, since the altitude H can be determined from the propagation time of the first strong reflection of the echo sound and it can further be assumed that $\theta_l=\theta_r$.

In a next step, the antenna pattern matrix A is calculated (item 3.2 in FIG. 3) and a system of linear equations is established:

$$[A]_{m1 \times m2} \cdot [w]_{m2 \times 1} = [r]_{m1 \times 1}. \quad (2)$$

The dimensions of A are m1×m2. m1 indicates the number of relevant angles of vision (e.g. 3, corresponding to the direction of the nadir and the left and right ambiguity) and m2 indicates the number of available antennas/overpasses. A includes the complex-valued elements of the antenna patterns for the m1 relevant viewing directions (e.g. for $\theta=0$, $\theta=\theta_r$, and $\theta=\theta_l$).

Should a single antenna have been used for all overpasses, the columns of A are identical except for an additional factor that is determined by the relative spatial distance between the antennas/overpasses (horizontal and vertical base lines $B_h$ and $B_v$) and a calibration phase. The elements of the matrix A are calculated as follows (item 3.2 in FIG. 3):

$$a_{k,i}(\theta_i) = G_k(\theta_i) \cdot \exp[4\pi/\lambda \cdot (B_{h,k} \sin(\theta_i) + B_{v,k} \cos(\theta_i)) - \phi_{cal,k}], \quad (3)$$

where $G_k$ is the complex-valued gain of the antenna k in the direction $\theta_i$.

Different propagation effects, e.g. due to different atmospheric conditions or ionospheric effects, can be taken into account using a calibration phase $\phi_{cal,k}$. It can be determined independently for each data recording k from the phase of the first strong ice surface reflection (item 3.3 in FIG. 3).

The column vector r in equation (2) includes information about the desired gain of the antenna arrangement. For example:

$$r = \begin{bmatrix} c \\ 0 \\ 0 \end{bmatrix}, c \neq 0,$$

for the three angles $\theta=0$, $\theta=\theta_r$, and $\theta=\theta_l$. This allows a signal suppression in the direction of the ambiguities $\theta_r$ and $\theta_l$ as well no suppression in the direction of the nadir.

The system of linear equations in equation (2) can be solved if a right inverse matrix of A exists, see Gilbert Strang: "Linear Algebra and its Applications", ISBN: 0155510053, 1988. In the application proposed, this is usually the case as soon as the number of recordings m2 is larger than or equal to the number of relevant angles m1 (m2≧m1). The complex-valued weights w for the different data recordings are calculated as follows (item 3.4 in FIG. 3):

$$[w]_{m2\times1} = [A]^T_{m2\times m1} \cdot [A^*A^T]^{-1}_{m1\times m1} \cdot [r]_{m1\times1}. \quad (4)$$

The last step is the weighted summing of the individual recordings in order to form a radargram that is characterized by the best suppression of ambiguities possible (item 3.5 in FIG. 3). The uncorrupted radar reflectivity of the nadir signal is thus calculated as (item 3.6 in FIG. 3):

$$\sigma(z) = \frac{S_{sum}(z)}{\sum_{k=1}^{m2} w_k(z) G_k(0)} \cdot L(z), \quad (5)$$

where $S_{sum}$, is the weighted sum of all data recordings and L is the loss due to the propagation in the ice medium, which in turn depends on the ice properties and the temperature.

The quality of the reconstruction of the nadir signal is determined by the ratio of the integrated performances of the synthesized antenna pattern in the angular range corresponding to the direction of the nadir and the directions of ambiguities (Integrated Signal to Clutter Ratio, ISCR):

$$ISCR = \frac{\int_{-\Delta\theta}^{\Delta\theta} G_{sum}(\theta) d\theta}{\int_{\theta_l-\Delta\theta}^{\theta_l+\Delta\theta} G_{sum}(\theta) d\theta + \int_{\theta_l-\Delta\theta}^{\theta_l+\Delta\theta} G_{sum}(\theta) d\theta}, \quad (6)$$

where the angular range $\Delta\theta$ can be selected in a manner suited to take into account different sources of error (e.g. inaccurate knowledge of the imaging geometry).

Figure 5:
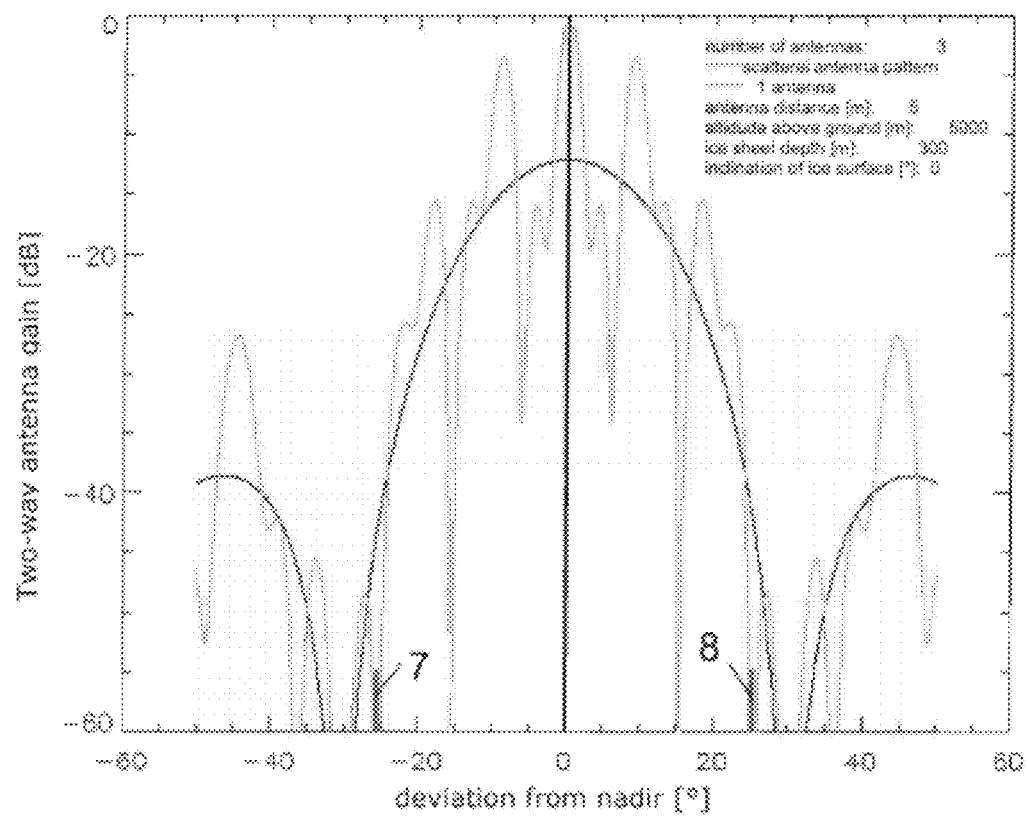
FIG. 5 illustrates, as another example, a synthetic diagram (course of the grey diagram line) of a sparsely occupied antenna arrangement of three antennas/overpasses at an altitude of 5000 m with an adaptive weighting for ice depths of 300 m in comparison with a diagram (course of the black diagram line) of a single antenna, the horizontal length of the base line for these three overpasses being 5 m.
Figure 6:
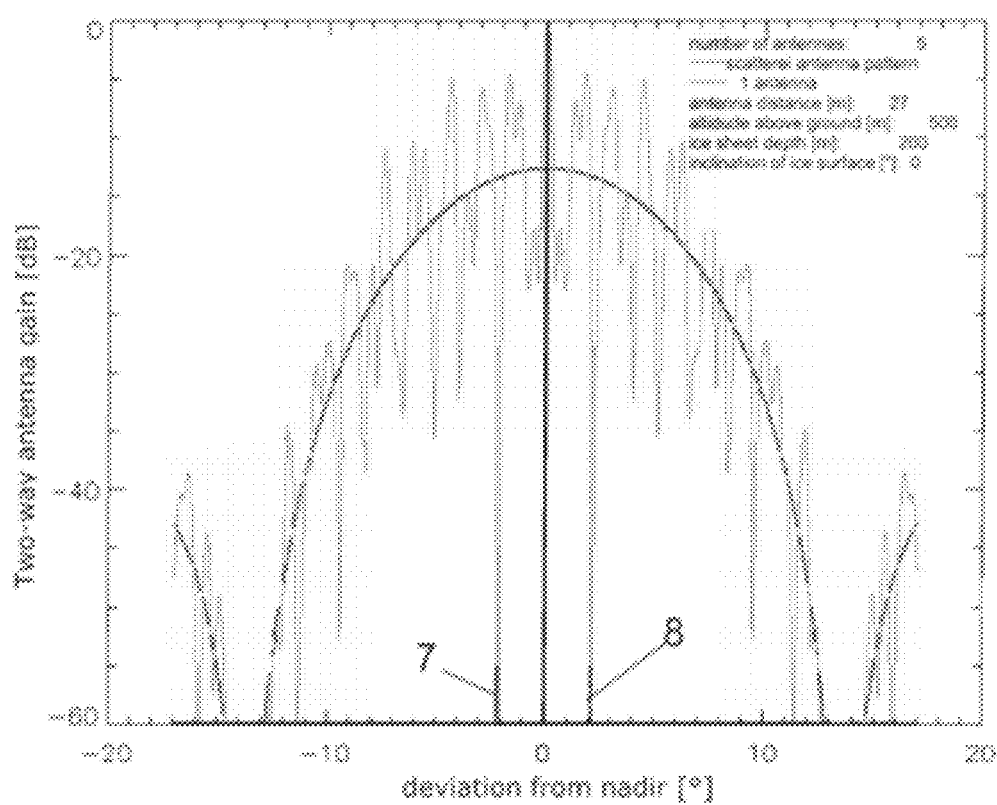
FIG. 6 illustrates, as a third example, a synthetic diagram (course of the grey diagram line) of a sparsely occupied antenna arrangement of five antennas/overpasses at an altitude of 500 km with an adaptive weighting for ice depths of 100 m in comparison with a diagram (course of the black diagram line) of a single antenna, the horizontal length of the base line for these five overpasses being approximately 27 m.
Figure 7:
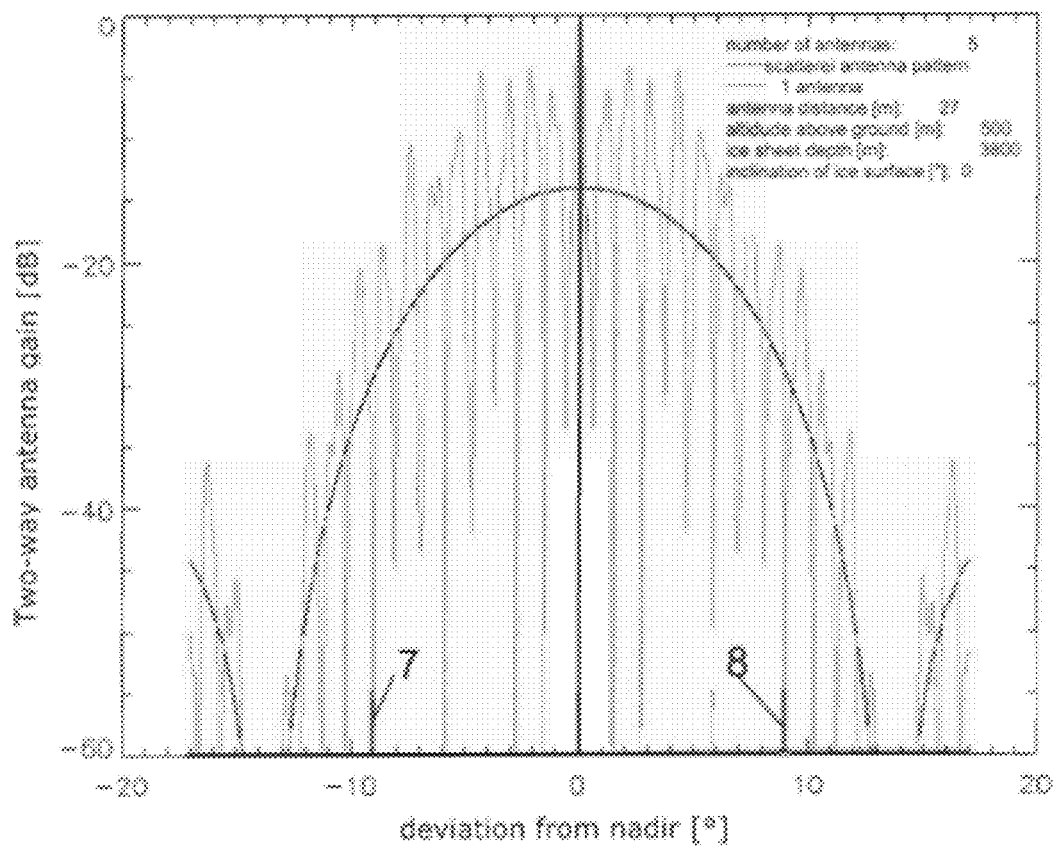
FIG. 7 illustrates, as a last example, a synthetic diagram (course of the grey diagram line) of a sparsely occupied antenna arrangement of five antennas/overpasses at an altitude of 500 km with an adaptive weighting for ice depths of 3800 m in comparison with a diagram (course of the black diagram line) of a single antenna, the horizontal length of the base line for these five overpasses being approximately 27 m.

Hereinafter, the method of the invention will be explained with reference to two different examples, i.e., on the one hand, for an airplane-borne implementation (FIG. 4 and FIG. 5) and, on the other hand, for an implementation in space (FIG. 6 and FIG. 7).

Figure 4:
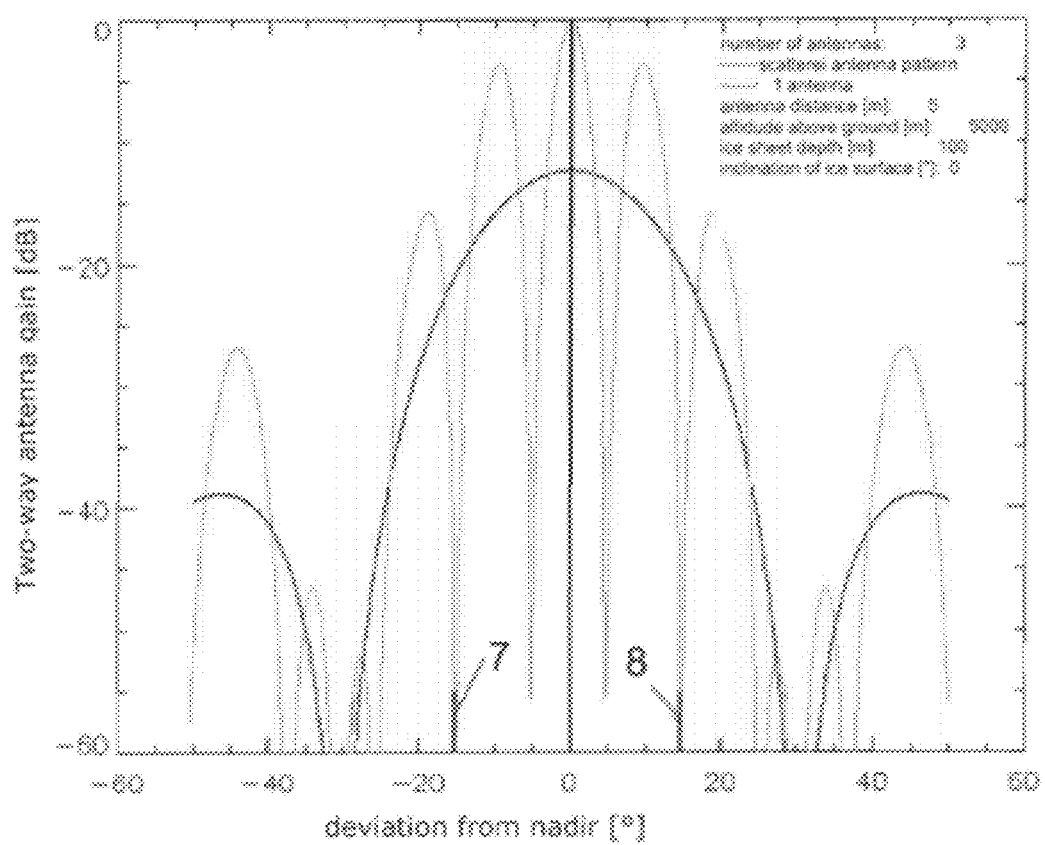
FIG. 4 illustrates, as an example, a synthetic diagram (course of the grey diagram line) of a sparsely occupied antenna arrangement of three antennas/overpasses at an altitude of 5000 m with an adaptive weighting for ice depths of 100 m in comparison with a diagram (course of the black diagram line) of a single antenna, the horizontal length of the base line for these three overpasses being 5 m.

FIG. 4 and FIG. 5 each are a diagram showing the gain [dB] of a single antenna (course of the black diagram line) as well as of a sparsely occupied antenna arrangement simulating three mutually offset overpasses of a radar sensor (course of the grey diagram line) as a function of the angle of deviation from the nadir [°] for the airplane-borne implementation. Here, for a wavelength of 70 cm, only three radar data signal recordings with an irregular distance of the horizontal base line length of approximately 5 m were used which were then combined in an adaptively weighted manner. The overpass altitude of the radar sensor above the ice region is about 5000 m in this example.

The results for two different ice depths are shown, i.e. for 100 m in FIG. 4 and for 300 m in FIG. 5. The positions of the left and the right ambiguity, marked by the numerals 7 and 8, respectively, are adaptively set to zero, thereby simultaneously guaranteeing an increased gain in the direction of the nadir. Using the adaptive control of the data recordings according to the invention, a diagram scattered in the form of grating lobes is obtained which, when compared with a single antenna, has an increased gain in the relevant direction of the nadir and has zero points at both ambiguities 7 and 8.

FIG. 6 and FIG. 7 illustrate similar diagrams for an antenna arrangement that is space-borne at an altitude of 500 km and simulates five mutually offset overpasses of a radar sensor (course of the grey diagram line), each in comparison with the diagram for a single antenna (course of the black diagram line). Here, the synthetic diagram is calculated from five irregularly sampled radar data signal recordings, the mean horizontal base line length being approximately 27 m.

The represented results refer to ice depths of 200 m in FIG. 6 and 3800 m in FIG. 7. Again, the positions of the left and right ambiguity, also indicated by the numerals 7 and 8, respectively, are adaptively set to zero, thereby simultaneously guaranteeing an increased gain in the direction of the nadir. With the adaptive weight control of the data recordings according to the invention, a diagram scattered in the form of grating lobes is again obtained which, when compared with a single antenna, has an increased gain in the relevant direction of the nadir and has zero points at both ambiguity positions 7 and 8.

| List of numerals | |
|---|---|
| 1 | antenna |
| 2 | reference plane, reference level |
| 3, 4 | surface echo signals |
| 5 | useful signal from the direction of the nadir |
| 6 | radar sensor |
| 7 | position of the left ambiguity |
| 8 | position of the right ambiguity |
| $B_h$ | horizontal base line length |
| $B_v$ | vertical base line length |
| H | perpendicular altitude |
| m2 | number of available overpasses |
| R | radius |
| z | maximum ice depth |
| $\Delta h_l$ | altitude of the left ambiguity above reference level |
| $\Delta h_r$ | altitude of the right ambiguity above reference level |
| $\Theta_l, \Theta_r$ | angle of deviation from the direction of the nadir |

The invention claimed is:

1. A method for examining an ice region or dry region using radar echo sounding, wherein a radar sensor flying over the region to be examined emits radar transmission pulses in the direction of the nadir, illuminating the surface and the inner volume of the region, wherein the reflected radar pulse signals received in the radar sensor are processed and evaluated to obtain a radargram, and wherein measures are provided to suppress ambiguities, characterized in that the region to be examined is overflown by the radar sensor or by multiple compatible radar sensors of the same operating wavelength on multiple spatially separated adjacent or parallel paths and the radar signal data received on each path are recorded, that the radar signal data recorded for each of the different paths are summed coherently and using a weighting to form a radargram, wherein an adaptive complex-valued weighting for each of the individual paths is performed using a geometrical model which takes into account the topography of the environment of the region to be examined, and that the complex-valued weighting for every depth of the examined region is determined by solving a system of linear equations from which is calculated a synthetic antenna pattern which has zero points in the direction of the ambiguities.

2. The method of claim 1, characterized by a coherent Doppler processing in the form of a filtering or a so-called "Doppler Beam Sharpening" so as to artificially reduce the antenna pattern in the direction of flight, so that ambiguity echo signals coming from reflections in front of and behind the radar sensor are filtered out or attenuated and the signal-to-noise ratio is improved due to the coherent summation of the interesting signal portions.

3. The method of claim 1, characterized in that, when airplane-borne radar sensors are used, the implementation is performed with parallel overpasses having short spatial base lines therebetween.

4. The method of claim 1, characterized in that, with a space-borne implementation, the radar data recorded on repeated orbits of the same radar sensor or similar compatible radar sensors are evaluated.

5. The method of claim 1, characterized by the scalability of the performance of e ambiguity suppression as a function of the number of available recordings/overpasses.

6. The method of claim 1, characterized in that a calibration phase is used to take into account different propagation effects that exist primarily due to different atmospheric or ionospheric effects.

7. The method of claim 6, characterized in that the calibration phase is determined independently for each data recording from the phase of the first strong ice surface reflection at the ice surface or at the surface of the dry region to be examined.

* * * * *